United States Patent [19]

Takubo

[11] 4,407,437
[45] Oct. 4, 1983

[54] SHOULDERING AID FOR A PORTABLE TELEVISION CAMERA

[75] Inventor: Takayuki Takubo, Yokohama, Japan

[73] Assignee: Victor Company of Japan, Limited, Yokohama, Japan

[21] Appl. No.: 259,457

[22] Filed: Apr. 30, 1981

[51] Int. Cl.³ .............................................. A45F 5/00
[52] U.S. Cl. .................................. 224/270; 224/265
[58] Field of Search ...................... 224/270, 265, 908; 354/82, 293, 295, 296; 352/243

[56] References Cited

U.S. PATENT DOCUMENTS

| | | | |
|---|---|---|---|
| 2,712,779 | 7/1955 | Tolcher | 224/265 X |
| 2,746,369 | 5/1956 | Beard et al. | 224/265 X |
| 2,753,778 | 7/1956 | Tolcher | 224/908 X |
| 3,767,095 | 10/1973 | Jones | 224/270 X |
| 4,244,500 | 1/1981 | Fournier | 224/265 |
| 4,306,790 | 12/1981 | Adams | 354/82 |

Primary Examiner—Steven M. Pollard
Attorney, Agent, or Firm—Lowe, King, Price & Becker

[57] ABSTRACT

A shouldering aid for a portable television camera comprises a base member attachable to the television camera and a shoulder pad member pivotally connected to one end of the base member. The inclination angle of the shoulder pad member may be freely adjusted by means of screws, while a hand grip is attached to the other end of the base member. A manipulation knob is incorporated in the hand grip, and this knob is interlocked by means of a linking mechanism with a start switch of the camera. An electronic view finder may be mounted on the camera by means of a mounting assembly having an upper and lower arms. A rear end of the shoulder pad member may be T-shaped so that the shouldering aid is capable of functioning as a tripod.

23 Claims, 18 Drawing Figures

SHOULDERING AID FOR A PORTABLE TELEVISION CAMERA

BACKGROUND OF THE INVENTION

This invention generally relates to a portable television camera, and more particularly, the present invention relates to a shouldering aid or supporter for carrying a portable television camera on a human's shoulder so as to perform stable shooting.

As video tape recorders have been popularized, portable television cameras for household use are becoming popular. Recent portable television cameras are small in size and light in weight so that they are as handy as customary eight-millimeter movie cameras. However, it is to be noted that there is a great difference in usage between television cameras and eight-millimeter cameras. Namely, in contrast to the short filming interval, such as several minutes, of eight-millimeter movie cameras, the maximum shooting interval of television cameras is two to six hours depending on the length and reeling speed of the video tape. When a user performs an extended shooting shooting, by gripping a hand grip of the portable television camera, he will become tired and stable shooting is thus made difficult. Some large size video cameras, therefore, have a shouldering aid or supporter, so that the camera can be carried on user's shoulder. However, these conventional large size television cameras are not handy because they have been originally designed to be carried on user's shoulder. Summarizing the prior art, although there have been some large size television cameras with a shouldering aid, such a conventional shouldering aid cannot be detached from the body of the camera. Therefore, such large size cameras do not have mobility, while small size portable television cameras do not have any shouldering aid. In other words, conventional portable television cameras could be used by gripping the hand grip thereof or by mounting the camera body on a stationary tripod.

SUMMARY OF THE INVENTION

The present invention has been developed in order to improve the performance and mobility of conventional portable television cameras.

It is, therefore, an object of the present invention to provide a shouldering aid for a portable television camera so that the stable shooting can be performed.

According to a feature of the present invention, a start switch of the television camera body is linked with a manipulation knob provided to a hand grip which is attached to the shouldering aid, so that the camera can be operated by simply manipulating the knob with a finger of a hand gripping the hand grip.

According to another feature of the present invention, a rear portion of the shouldering aid can be folded when unnecessary so that the entire assembly of the camera body and the shouldering aid is small in size.

According to another feature of the present invention, the hand grip is detachable from the shouldering aid, while the shouldering aid per se can be detached from the body of the camera, and the detached hand grip may be directly attached to the camera body so as to permit the camera to be used in the conventional manner.

According to another feature of the present invention, a view finder attaching member is provided to attach an electronic view finder having an eyepiece portion arranged one side of the camera body so that the shooter can readily see the shooting picture through the eyepiece portion thereof.

According to a further feature of the present invention, one end portion of the shouldering aid is made wider than the remaining portions thereof so that the shouldering aid can also be used as a tripod.

According to a further feature of the present invention, one end of the shouldering aid has a through-hole through which a hand strap attached to the hand grip can be bound so that the shouldering aid can also be used as a grip for carrying the camera.

In accordance with the present invention there is provided a shouldering aid for a portable television camera having a mechanically operable start switch and a detachable hand grip, comprising:

(a) a base member arranged to be attachable to the body of said portable television camera, said base member having a front end portion and a rear end portion, said front end portion having means for attaching said hand grip having a manipulation knob; (b) a linking mechanism arranged to slide with respect to said base member for interlocking said manipulation knob of said hand grip and said start switch of said television camera; (c) a shoulder pad member attached at a front end portion thereof to said rear end portion of said base member; and (d) means for fastening said shoulder pad member to said base member.

In accordance with the present invention there is also provided a shouldering aid for a portable television camera having a mechanically operable start switch, comprising: (a) a base member arranged to be attachable to the body of said portable television camera, said base member having a front end portion and a rear end portion; (b) a hand grip attached to said front end of said base member; (c) a manipulation knob incorporated in said hand grip; (d) a linking mechanism arranged to slide with respect to said base member for interlocking said manipulation knob and said start switch of said television camera; (e) a shoulder pad member attached, at a front end portion thereof, to said rear end portion of said base member; and (f) means for fastening said shoulder pad member to said base member.

In accordance with the present invention there is further provided a shouldering aid for a portable television camera, having a detachable hand grip, comprising: (a) a base member arranged to be attachable to the body of said portable television camera, said base member having a front end portion and a rear end portion, said front end portion having means for attaching said hand grip; and (b) a shoulder pad member attached, at a front end portion thereof, to said rear end portion of said base member, said shoulder pad member having a rear end portion, the transverse width of which is so wide that said shouldering aid is capable of functioning as a tripod.

In accordance with the present invention there is further provided a shouldering aid for a portable television camera, comprising: (a) a base member arranged to be attachable to the body of said portable television camera, said base member having a front end portion and a rear end portion; (b) a hand grip attached to said front end portion of said base member; and (c) a shoulder pad member attached, at a front end portion thereof, to said rear end portion of said base member, said shoulder pad member having a rear end portion, the transverse width of which is so wide that said shouldering aid is capable of functioning as a tripod.

In accordance with the present invention there is further provided a shouldering aid for a portable television camera, comprising: (a) a base member arranged to be attachable to the body of said portable television camera, said base member having a front end portion and a rear end portion; (b) a shoulder pad member attached, at a front end portion thereof, to said rear end portion of said base member; and (c) an electronic view finder mounting assembly having a lower end arranged to be interposed between an upper surface of said base member and the bottom of said portable television camera, and an upper end arranged to be placed on the top of said television camera.

BRIEF DESCRIPTION OF THE DRAWINGS

The object and features of the present invention will be more readily apparent from the following detailed description of the preferred embodiments taken in conjunction with the accompanying drawings in which.

In the drawings, the same or corresponding elements and parts are designated at like reference numerals.

DETAILED DESCRIPTION OF THE INVENTION

Figure 1:
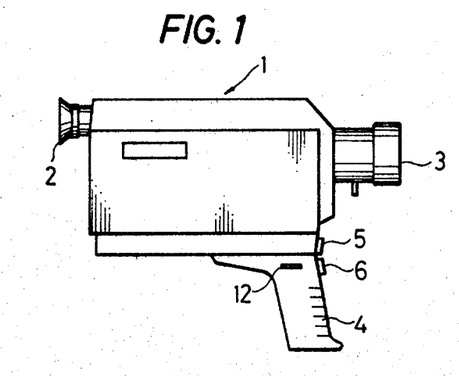
FIG. 1 is a view of a conventional portable television camera to which the shouldering aid according to the present invention may be attached.

Referring to FIG. 1, a typical conventional handy or portable television camera is shown. The television camera has a body 1 equipped with a lens 3 and a view finder 2, and a hand grip 4 attached to the bottom of the television camera body 1. This camera is of a through-the-lens (TTL) type so that a user or shooter can see a shooting view through the view finder 2. The hand grip 4 is attached to the camera body 1 by means of a screw 12 which can be manually rotated. Thus the hand grip is detachable from the camera body 1. The camera body 1 is equipped with a start switch 5 with which on-off operations of the camera may be controlled. The hand grip 4 is equipped with a manipulation knob or trigger 6 which is mechanically linkable with the above-mentioned start switch 5. The manipulation knob 6 is biased by a force of a spring (not shown) outward. In order to perform shooting, a user depresses the manipulation knob 6 against the force of the spring. As a result, the start switch 5 is operated to cause the camera to start operating.

As will be described in detail hereinbelow, the shouldering aid according to the present invention is attached to the bottom portion of a customary handy television camera such as shown in FIG. 1. Accordingly, the hand grip 4 of the camera has to be detachable.

Figure 2:
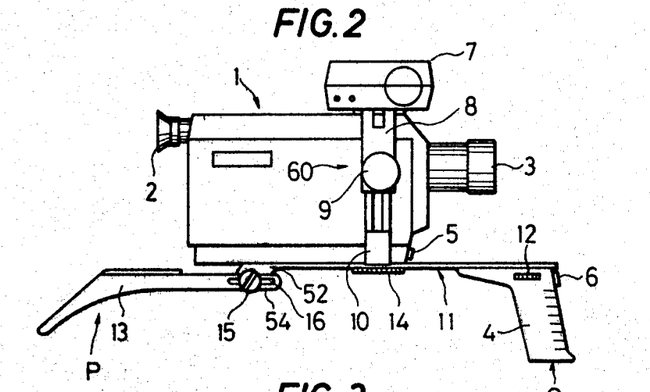
FIG. 2 is a schematic side view of a television camera assembly having a shouldering aid according to the present invention.
Figure 3:
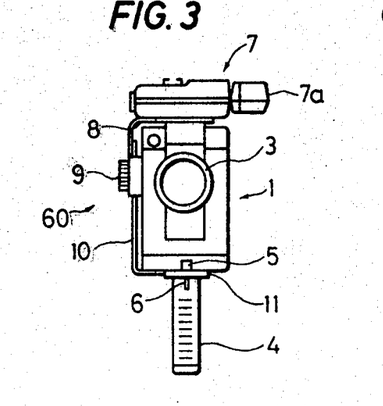
FIG. 3 is a schematic front view of the television camera assembly of FIG. 2.

Reference is now made to FIGS. 2 and 3 which are side and front views of a television camera assembly having a shouldering aid according to the present invention. The shouldering aid generally designated at a reference 50 comprises an elongate base member 11 and a curved shoulder pad member 13. The base member 11 is made of an aluminum diecasting, and a through-hole is made at a point in the vicinity of the center in its longitudinal length. A screw is arranged to penetrate the through-hole to be engaged with a threaded hole (not shown) made at the bottom of the camera body 1. This threaded hole is one for receiving the screw 12 of the hand grip 4 as described with reference to FIG. 1. Another threaded hole is made at a point in the vicinity of the tip of the base member 11 for receiving the screw 12 of the hand grip 4. Thus, the hand grip 4 of FIG. 1 has been detached from the camera body 1 to be attached to the base member 11. The other end, which will be referred to as a rear end, of the base member 11 has two wall portions 52 extending in a direction perpendicular to the plane of the base member 11. A threaded hole is made in each of the wall portions 52. The shoulder pad member 13 has, at its tip portion, two projecting portions 54 which are separated by a distance a little larger than the space between the wall portions 52 of the base member 11. Namely, the tip portion of the shoulder pad member 13 is of fork-like shape. The shoulder pad member 13 is made of a suitable synthetic resin. Each of the projecting portions 54 has an elongate through-hole or slit 16 through which a screw 15 can be inserted to screw the shoulder pad member 13 to the wall portions 52 of the rear end of the base member 11. The shoulder pad member 13 is so curved that it will fit a shoulder of a user.

Figure 4:
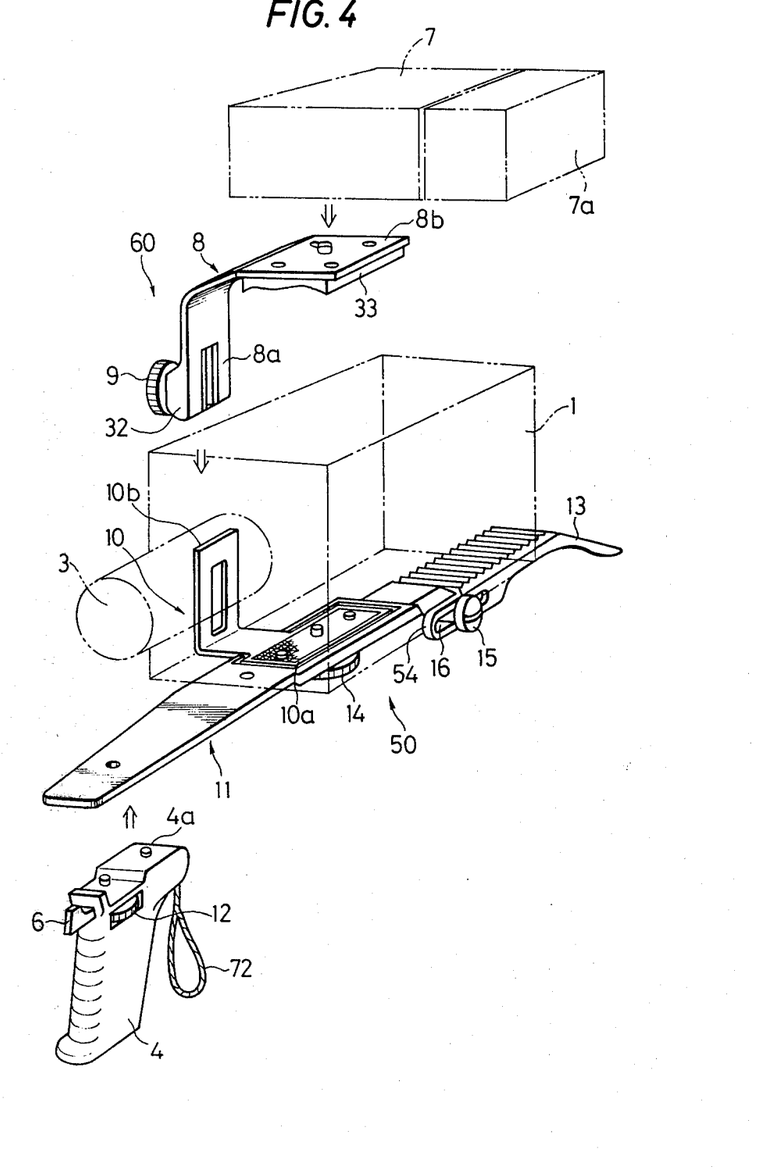
FIG. 4 is an exploded view of the television camera assembly of FIGS. 2 and 3.
Figure 5:
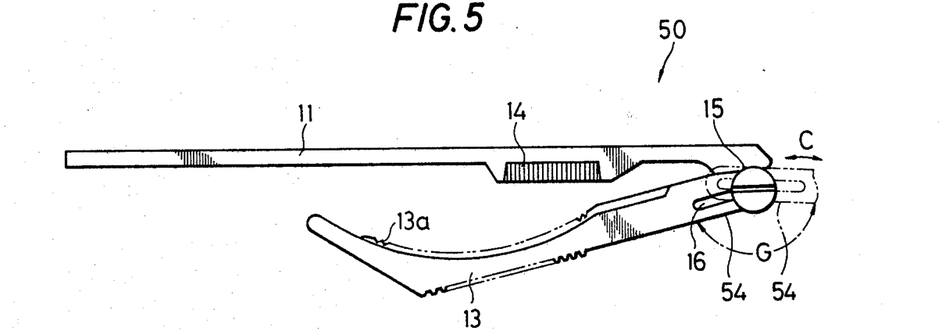
FIG. 5 is an enlarged side view of the shouldering aid of FIGS. 2, 3 and 4.
Figure 6:
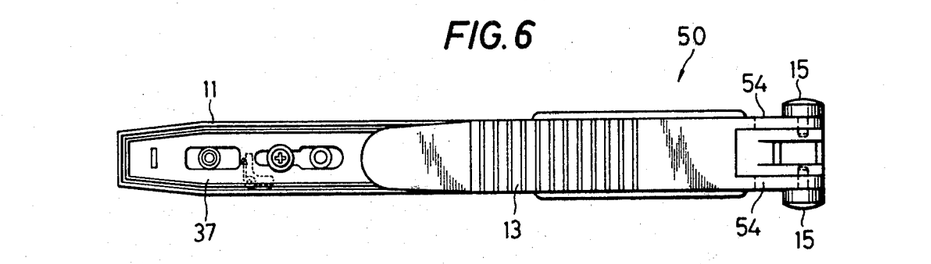
FIG. 6 is an enlarged bottom plan view of the shouldering aid of FIG. 5.

The above-mentioned connection between the base member 11 and the shoulder pad member 13 is also seen in a perspective exploded view of FIG. 4, and in enlarged side and plan views of the shouldering aid 50 of FIGS. 5 and 6. Since the shoulder pad member 13 is pivotally attached to the base member 11 by means of the screws 15, the shoulder pad member 13 is rotatable with respect to the base member 11 as best seen in FIG. 5. Namely, the shoulder pad member 13 can be rotated as indicated by a curved arrow G. In addition, since the through-hole 16 of each of the projecting portions 54 of the shoulder pad member 13 is of elongate shape, the shoulder pad member 13 can be moved or slid in a given direction as indicated by an arrow C in FIG. 5. From the above, it will be understood that the shoulder pad member 13 is foldable as shown in FIGS. 5 and 6, while the entire length of the shouldering aid 50 can be freely adjusted by pulling or depressing the shoulder pad member 13 with respect to the base member 11. The two screws 15 may be replaced with a single screw which extends from one projecting portion 54 to the other.

On a concavely curved surface of the shoulder pad member 13 is attached a sheet 13a made of foamed rubber, a foamed synthetic resin, felt or the like. The sheet 13a is preferably soft and has high friction, so that the user's shoulder is effectively protected while it prevents the shoulder pad member 13 from slipping off or sliding on the shoulder.

As shown in FIGS. 2 to 4, an electronic view finder 7 is mounted at the top of the camera body 1. Although it is possible to use the original view finder 2, which is of TTL type, when the television camera assembly is carried on a user's shoulder, the user has to bend his neck to see through the original view finder 2 because the view finder 2 is just above his shoulder. Such inconvenience arises because the original view finder 2 is located close to a center axis which passes through the camera body 1 from the front portion thereof to the rear portion, and is further located at the rear portion of the camera body 1. According to the present invention, an additional view finder 7 which is an electronic type, is provided in such a manner that an eyepiece 7a thereof is located apart from the center axis as best seen in FIGS. 3 and 4.

In order to mount the electronic view finder 7, having a monitor picture tube, 1 at a position on the camera body most suitable for the user's eye position, a view finder mounting assembly 60, shown in FIGS. 2, 3 and 4, is employed. The view finder mounting assembly 60 comprises an upper L-shaped arm 8 and a lower L-shaped arm 10 which is connected to the upper L-shaped arm 8 by means of a screw 9. One end of the lower L-shaped arm 10 is interposed or sandwiched between the bottom of the camera body 1 and an upper surface of the base member 11, while the other end of the lower L-shaped arm 10 is screwed to one end of the upper L-shaped arm 8. The electronic view finder 7 is mounted on the other end of the upper L-shaped arm 8 as seen in FIG. 4. The structure of the view finder mounting assembly 60 will be further described in detail hereinafter.

Figure 7:
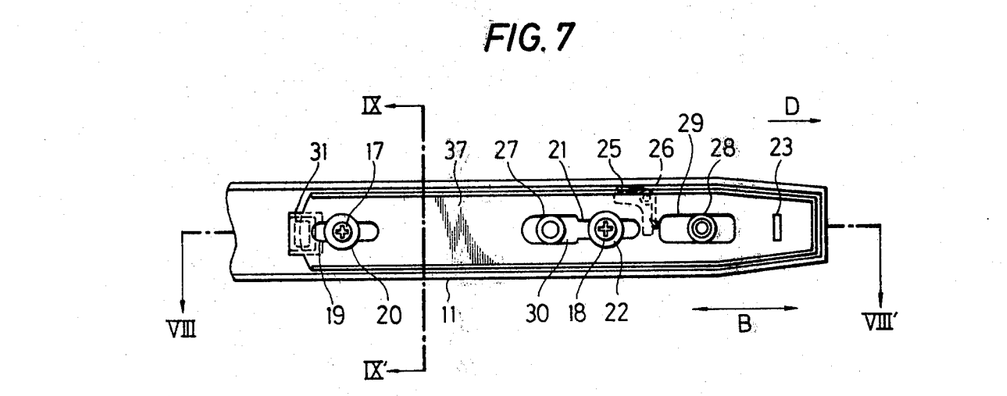
FIG. 7 is a partial bottom plan view of the shouldering aid of FIGS. 2 to 6.
Figure 8:
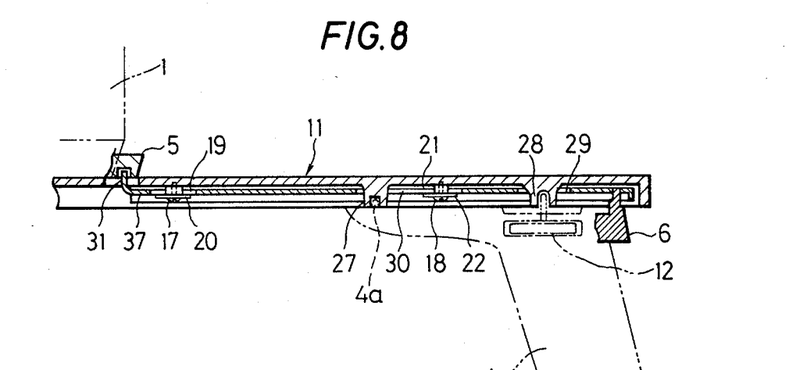
FIG. 8 is a cross-sectional partial side view of the shouldering aid of FIG. 7 taken along the line VIII-–VIII'.
Figure 9:
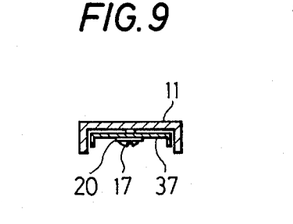
FIG. 9 is another cross-sectional view of the shouldering aid of FIG. 7 taken along the line IX–IX'.

Reference is now made to FIGS. 7, 8 and 9 which respectively show an enlarged bottom plan view of the base member 11 of the shouldering aid 50, a cross-sectional view of the same taken along the line VIII-VIII' of FIG. 7 and another cross-sectional view of the same taken along the line IX-IX' of FIG. 7. As is best seen in FIG. 9, the transverse cross-section of the base member 11 is U-shaped so as to receive a linking member 37 therein. The linking member 37 is made of a substantially flat plate, and is arranged to slide in directions indicated by an arrow B in FIG. 7. The peripheral portions of the linking member 37 are bent downward so that its transverse cross-section is also U-shaped as shown in FIG. 9, reinforcing the linking member 37 per se. The linking member 37 has elongate holes 19 and 21 at given positions, where the linking member 37 is slidably attached to the base member 11 by means of screws 17 and 18 which penetrate the elongate holes 19 and 21. In detail, each of the screws 17 and 18 is equipped with a washer 20 or 22, and is engaged with threaded holes made in the upper portion of the base member 11 as best seen in FIG. 8. The linking member 37 is biased by means of an L-shaped spring 25, which is attached to a pin 26 mounted on the base member 11, in a direction toward the front end or tip portion of the base member 11, namely, in the direction indicated by an arrow D in FIG. 7. In the linking member 37 are made other elongate holes 30 and 29 at given positions, and these holes 30 and 29 are used such that bosses 27 and 28 integrally formed with the base member 11 respectively project therethrough. A recess is made at the bottom center of the first boss 27, while a threaded hole is made at the bottom center of the second boss 28. As shown in FIG. 8, the recess or hole of the first boss 27 is used for receiving a projection 4a of the hand grip 4, while the threaded hole of the second boss 28 is used for engaging with the screw 12 of the hand grip 4. With this arrangement, when hand grip 4 is attached to the base member 11 of the shouldering aid 50, the hand grip 4 is secured by the screw 12, while horizontal rotation of the hand grip 4 is prevented by the engagement of the projection 4a with the recess of the first boss 27.

A rectangular hole 23 is made in the vicinity of the tip portion of the linking member 37, while the rear portion of the linking member 37 is upwardly bent as shown in FIGS. 7 and 8. The rectangular hole 23 is used for receiving a portion of the manipulation knob 6 of the hand grip 4, while the upwardly bent portion or rear end 31 of the linking member 37 is received in a recess made in the lower portion of the start switch 5 provided to the television camera body 1. In order that the rear end 31 of the linking member 37 can be received in the recess of the start switch 5, an opening is made at a given position of the base member 11.

When it is intended to operate the television camera, the manipulation knob 6 or trigger of the hand grip 4 is depressed in the same manner as in conventional cameras. As the manipulation knob 6 moves leftward in the drawing, the linking member 37 is moved in the same direction causing the rear end 31 to depress the start switch 5 so that the camera 1 starts operating. When the manipulation knob 6 is released, the linking member 37 returns rightward by the force of the spring 25. With this provision, the hand grip 4 is capable of functioning not only as a hand grip but also as a base of a trigger for shooting. The position of the hand grip may be determined such that the hand grip 4 can be readily gripped by a user's hand when the above-mentioned shoulder pad member 13 is placed on his shoulder. Since the hand grip 4 is attached to the base member 11 of the shouldering aid 50 at a position ahead of the camera body 1, the user can stretch his arm to grip the hand grip 4, and therefore, the camera body 1 can be stably supported by the hand grip 4 and the shoulder pad member 13. It is to be noticed that the television camera body 1 is supported at two points respectively indicated by P and Q in FIG. 2, which points P and Q are separated by a distance longer than the entire length of the camera body 1.

Figure 10:
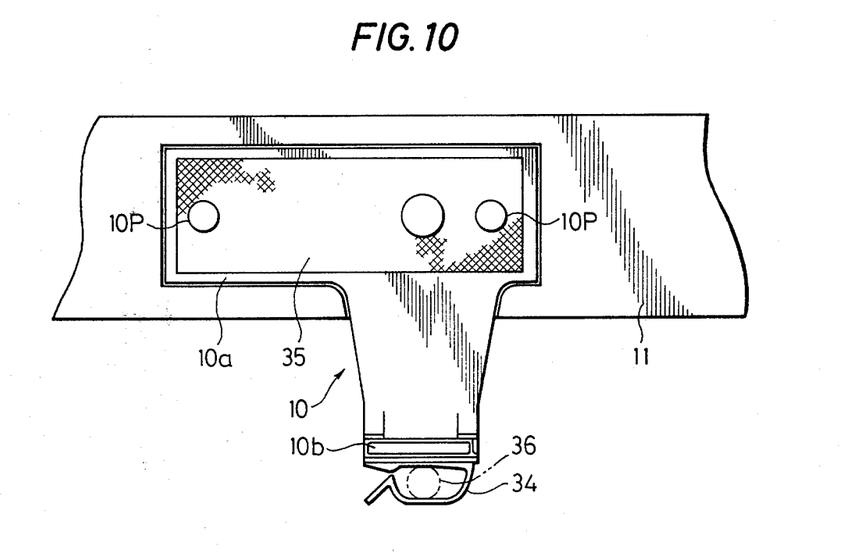
FIG. 10 is an explanatory top plan view showing the way of attaching the electronic view finder of FIGS. 2 to 4.
Figure 11:
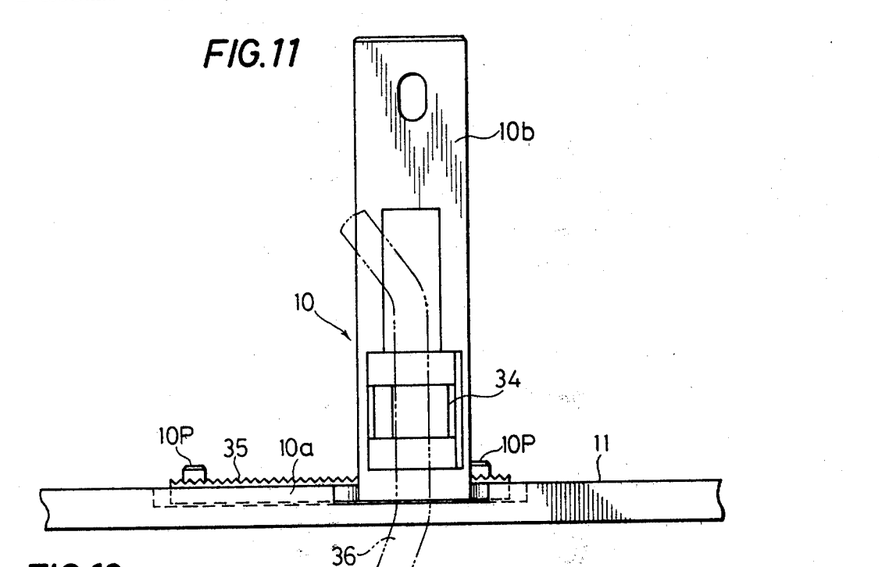
FIG. 11 is an explanatory side view showing the way of attaching the electronic view finder of FIGS. 2 to 4.
Figures 12, 13:
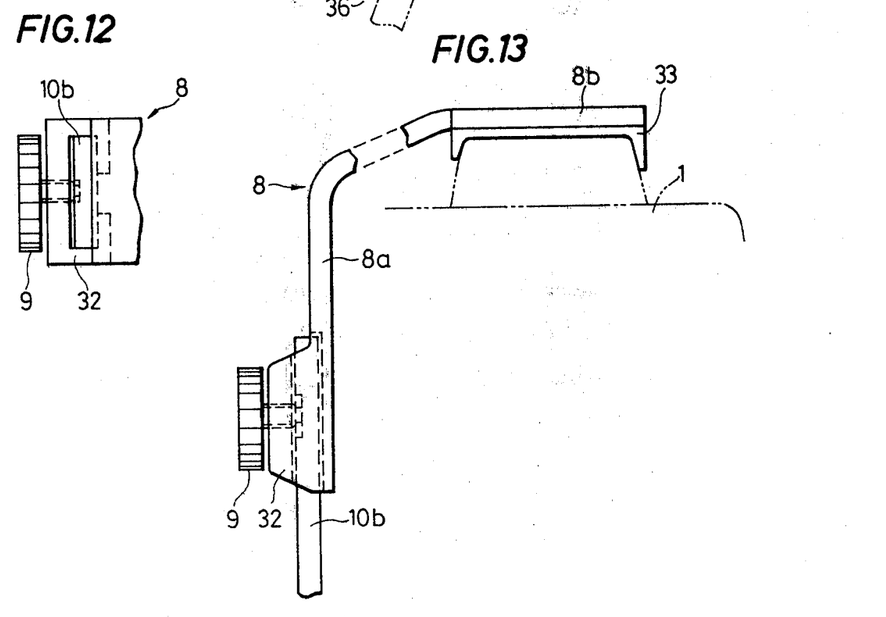
FIG. 12 is an explanatory enlarged top plan view showing the way of attaching the view finder of FIGS. 2 to 4.
FIG. 13 is an explantory enlarged front view showing the way of attaching the electronic view finder of FIGS. 2 to 4.

Attachment of the view finder mounting assembly 60 will now be described with reference to FIGS. 4, 10, 11, 12 and 13. FIG. 10 is a top plan view of the lower L-shaped arm 10; FIG. 11, a side view thereof; FIG. 12, a partial top plan view of the upper L-shaped arm 8; and FIG. 13, a partial front view of the same. As seen in FIGS. 10 and 11, the lower L-shaped arm 10 has a base portion 10a and an arm portion 10b which is integrally formed with and substantially perpendicular to the base portion 10a. A rectangular recess is made on the upper surface of the base member 11 of the shouldering aid 50 so as to receive the above-mentioned base portin 10a of the lower L-shaped arm 10. The depth of the recess for receiving the base portion 10a is substantially equal to the thickness of the base portion 10a. Accordingly, when the base portion 10a is fitted in the recess, the upper surface of the base portion 10a is flush with the upper surface of the base member 11. A thin sheet 35 made of rubber, a synthetic resin, or the like, is adhered to the upper surface of the base portion 10a. The upper surface of the sheet 35 is made rough so as to prevent the lower L-shaped arm 10 from rotating. Two projections or bosses 10p are integrally formed with the base portion 10a, and these projections 10p will be received in corresponding recesses made at the bottom of the camera body 1, so that the base member 11 is prevented from rotating. As is shown in FIGS. 2 and 4, the base member 11 is fixedly secured by the screw 14 to the bottom of the camera body, while the base portion 10a of the lower L-shaped arm 10 is securely interposed between the bottom of the camera body 1 and the base member 11.

The arm portion 10b of the lower L-shaped arm 10 has a clamp 34 made of a synthetic resin or like, which clamp 34 is securely fixed to one side of the arm portion 10b. This clamp 34 is used for holding a cable 36 which establishes electrical connection between the camera body 1 and the electronic view finder 7.

The above-mentioned upper L-shaped arm 8 has a flat and rectangular box or pipe portion 32 at one end as shown in FIGS. 12 and 13, and the upper end of the arm portion 10b of the lower L-shaped arm 10 is inserted into the box portion 32 of the upper L-shaped arm 8. The box portion 32 is equipped with a screw 9 which can be tightened for fixedly connecting the upper L-shaped arm 8 to the lower L-shaped arm 10. The other end portion of the upper L-shaped arm 8 has a mount 8b for carrying the electronic view finder 7 thereon. On the lower surface of the mount 8b is attached a cushion member 33 made of a resilient material, such as a foamed synthetic resin, and the cushion member 33 has a shaped corresponding to the top of the camera body 1.

When mounting the electronic view finder 7, the electronic view finder 7 may be attached to the mount 8b of the upper L-shaped arm 8 before the upper L-shaped arm is attached to the lower L-shaped arm 10. Then the upper L-shaped arm 8 is depressed downward so that the cushion member 33 is tightly pressed on the top of the camera body 1. Under this condition, the screw 9 is tightened to fix the upper L-shaped arm 8. Of course, if desired, the upper L-shaped arm 8 may be attached to the lower L-shaped arm 10 before the electronic view finder 7 is mounted thereon.

As best seen in FIGS. 3 and 4, an eyepiece 7a of the electronic view finder 7 is located at a position which is spaced apart from the longitudinal center axis of the camera body 1 by a given distance. In this embodiment, the eyepiece 7a is located at the left side of the camera when viewed from the rear of the camera body 1. Namely, when the shoulder pad member 13 of the shouldering aid 50 carried on the right shoulder of a user, the eyepiece 7a of the electronic view finder 7 will be located just in front of his right eye. Of course, it is possible to change the arrangement so that the television camera assembly can be carried on the left shoulder of a user if desired, by using an electronic view finder having its eyepiece at the other side.

Figure 14:
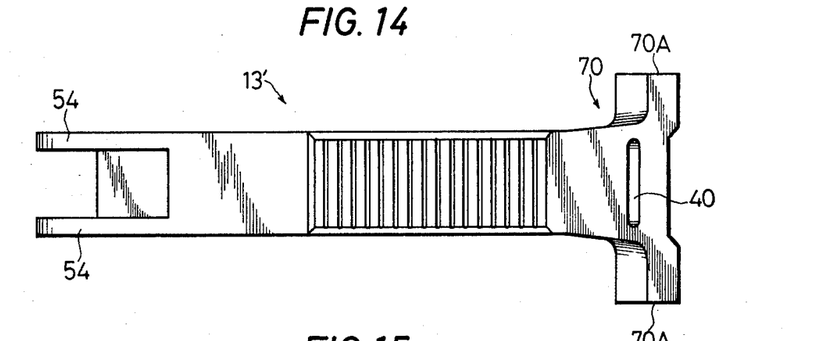
FIG. 14 is a partial top plan view of a second embodiment of the shouldering aid according to the present invention.
Figure 15:
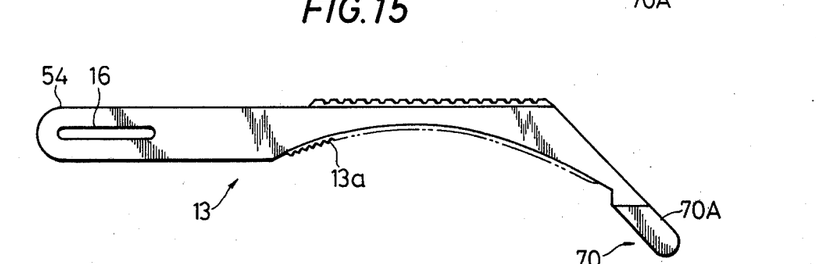
FIG. 15 is a partial side view of the shouldering aid of FIG. 14.
Figure 16:
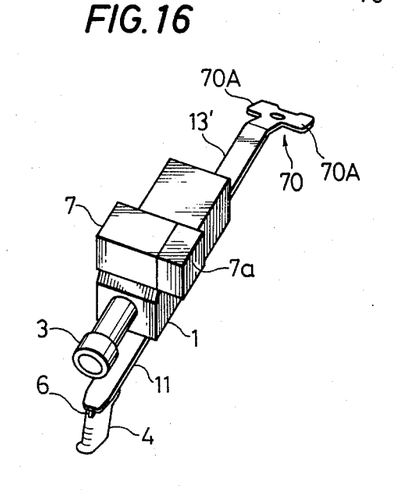
FIG. 16 is a schematic perspective view of a television camera assembly having the second embodiment shouldering aid of FIGS. 14 and 15, which shouldering aid functions as a tripod.

Reference is now made to FIGS. 14 and 15 which respectively show a top plan view of a shoulder pad member 13′ used for a second embodiment shouldering aid, and a side view thereof. Although an entire view of the second embodiment shouldering aid is not shown, the shoulder pad member 13′ of FIGS. 14 and 15 may be used in place of the above-mentioned shoulder pad member 13 of FIGS. 2 to 6. The shoulder pad member 13′ of the second embodiment differs from the first embodiment of FIGS. 2 to 6 in that the rear end of the shoulder pad member 13′ is T-shaped, and in that a slot 40 is made in the vicinity of the rear end. In detail, the rear end 70 of the shoulder pad member 13′ has two projecting portions 70A respectively extending in directions perpendicular to the longitudinal direction of the shoulder pad member 13′. The width W of the T-shaped end 70, i.e. the distance between tip portions of the projecting portions 70A, is selected substantially corresponding to the width of the television camera body 1. The T-shaped rear end 70 of the shoulder pad member 13′ will be used as portions of a tripod when it is intended to stationarily place the television camera assembly on a floor, stand, table or the like as shown in FIG. 16. Namely, these two projecting portions 70A and the bottom of the hand grip 4 are used as supporting points. Atlhough the rear end portion 70 of this embodiment is of T-shape, other shapes, such as a Y-shape, a triangular shape, or a rectangular shape for example, may be adopted. What is required is that the width W of the rear end portion 70 of the shoulder pad member 13′ is as wide as the width of the television camera body 1. Of course, if desired, the width W may be further increased beyond the width of the camera body 1. However, an excessively wide rear end may cause the camera assembly to be bulky. Since the inclination angle of the shoulder pad member 13′ may be freely adjusted as described in connection with the first embodiment, the shooting angle of the television camera body 1 may be adjusted by loosing and tightening the screws 15 (see FIGS. 2, 4, 5 and 6). Furthermore, the position of the shoulder pad member 13′ with respect to the base member 11 may be freely adjusted to a desired arrangement in the same way.

Figure 17:
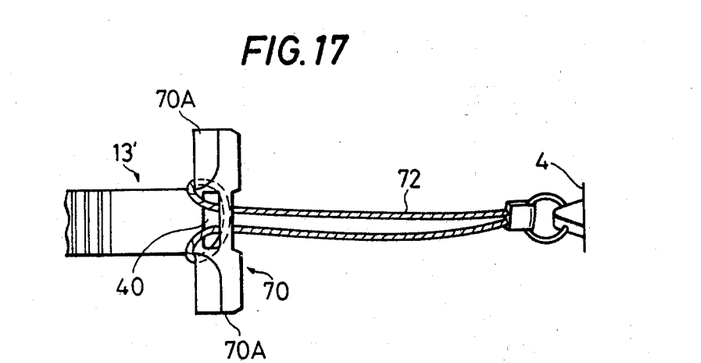
FIG. 17 is a partial top plan view of the second embodiment shouldering aid of FIGS. 14 to 16, showing a binding of a hand strap to the shouldering aid so that the shouldering aid functions as a hand grip.
Figure 18:
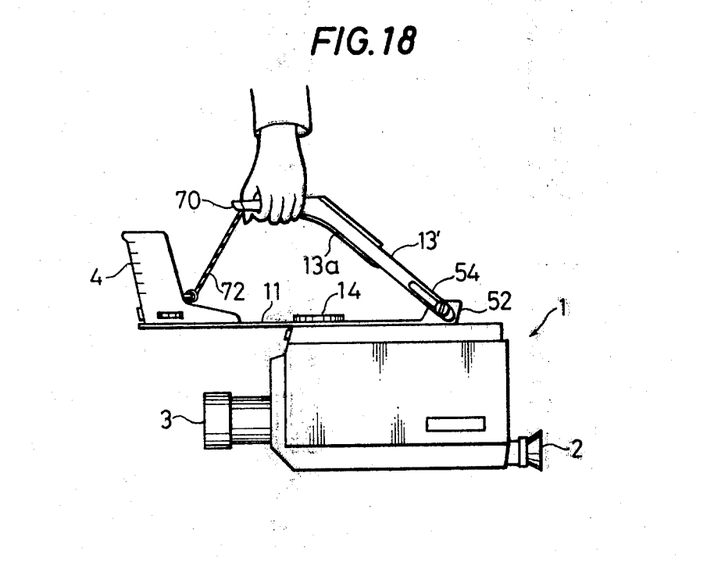
FIG. 18 is a side view showing the usage of the shouldering aid as a hand grip for carrying the television camera assembly.

Now, the usage of the above-mentioned slot 40 made at the rear end portion 70 of the shoulder pad member 13′ will be described with reference to FIGS. 17 and 18. Although it is not shown in FIGS. 2 and 3, a hand strap 72 is attached to the hand grip 4 as shown in FIG. 4. The hand strap 72 is a conventional one, and forms a loop. One end of the loop-like hand strap 72 is inserted through the slot 40, and then is pulled so that a portion of the loop is looped around the T-shaped rear end 70. Then the hand strap 72 is pulled toward the hand grip 4 so that the T-shaped rear end 70 is looped up. As a result, one end of the hand strap 72 is fastened to the rear end 70 of the shoulder pad member 13' as shown in FIG. 18. The shoulder pad member 13' may be gripped when carrying the television camera assembly by hanging it upside down.

From the foregoing description, it will be understood that the shouldering aid according to the present invention not only makes it possible to perform extended shooting with stable pictures by carrying the camera assembly on a user's shoulder, but also functions as a portion of a tripod for stationarily placing the camera assembly on a stationary member. Furthermore, a portion of the shouldering aid can be folded and looped up by the hand strap attached to the hand grip so as to be convenient for carrying the camera assembly.

Although the invention has been described with reference to two embodiments thereof, the invention is not limited to these examples. For example, although the hand grip 4 attached to the base member 11 of the shouldering aid 50 is one which has been detached from the camera body 1 in the above embodiments, if desired, an exclusive hand grip may be provided. In this case, an electrical switch may be attached to the exclusive hand grip in place of the manipulation knob 6. The electrical switch may be electrically connected to the camera body 1 so that on-off operations of the camera body 1 can be controlled without employing a mechanical linking member. Moreover, although the electronic view finder 7 is attached to the camera body by means of the upper and lower L-shaped arms 8 and 10 in the described embodiments, the electronic view finder 7 may be directly mounted on the camera body 1 by means of suitable fastening means, such as a screw. Furthermore, although the position of the shoulder pad member 13 and 13' with respect to the base member 11 can be changed in the directions C of FIG. 5 in the embodiments, the position thereof does not have to be necessarily adjustable if the shoulder pad member 13 and 13' is foldable. In this way, it will be apparent to those skilled in the art that many modifications and variations may be made without departing from the spirit of the present invention.

What is claimed is:

1. A shouldering aid for a portable television camera having a mechanically operable start switch and a detachable hand grip, comprising:
    (a) a base member arranged to be attachable to the body of said portable television camera, said base member having a front end portion and a rear end portion, said front end portion having means for attaching said hand grip having a manipulation knob;
    (b) a linking mechanism arranged to slide with respect to said base member for interlocking said manipulation knob of said hand grip and said start switch of said television camera, said linking mechanism having a generally flat and elongate plate slidably attached to said base member, and means for biasing said plate in one direction;
    (c) a shoulder pad member attached, at a front end portion thereof, to said rear end portion of said base member; and
    (d) means for fastening said shoulder pad member to said base member.

2. A shouldering aid for a portable television camera having a mechanically operable start switch, comprising:
    (a) a base member arranged to be attachable to the body of said portable television camera, said base member having a front end portion and a rear end portion;
    (b) a hand grip attached to said front end of said base member;
    (c) a manipulation knob incorporated in said hand grip;
    (d) a linking mechanism arranged to slide with respect to said base member for interlocking said manipulation knob of said hand grip and said start switch of said television camera, said linking mechanism having a generally flat and elongate plate slidably attached to said base member, and means for biasing said plate in one direction;
    (e) a shoulder pad member attached, at a front end portion thereof, to said rear end portion of said base member; and
    (f) means for fastening said shoulder pad member to said base member.

3. A shouldering aid for a portable television camera as claimed in claim 1 or 2, wherein the fastening means comprises at least one screw so that the inclination angle of said shoulder pad member can be adjusted and fixed with respect to said base member.

4. A shouldering aid for a portable television camera as claimed in claim 3, wherein said shoulder pad member has at least one elongate slot for receiving said screw.

5. A shouldering aid for a portable television camera as claimed in one of claims 1 or 2, wherein said shoulder pad member comprises a curved portion arranged to fit a user's shoulder.

6. A shouldering air for a portable television camera as claimed in claim 5, further comprising a sheet made of a soft material attached to said curved portion.

7. A shouldering aid for a portable television camera as claimed in claim 1 or 2, wherein said front end portion of said shoulder pad member comprises two projections each having an elongate slot through which a screw is engaged with a threaded hole made at said rear end portion of said base member.

8. A shouldering aid for a portable television camera as claimed in claim 1 or 2, wherein a recess is made in the upper surface of said base member for receiving a portion of an electronic view finder mounting assembly therein.

9. A shouldering aid for a portable television camera as claimed in claim 6, further comprising an electronic view finder mounting assembly, said mounting assembly having an upper L-shaped arm and a lower L-shaped arm securely connectable to each other, said lower L-shaped arm having a base portion received in said recess made in said upper surface of said base member, said upper L-shaped arm having a mount for carrying said electronic view finder electrically connected to said television camera.

10. A shouldering aid for a portable television camera as claimed in claim 1 or 2, wherein a rear end portion of said shoulder pad member has a width greater than that of remaining portions.

11. A shouldering aid for a portable television cameras as claimed in claim 1 or 2, wherein a rear end portion of said shoulder pad member has a width substantially equal to the width of said television camera body.

12. A shouldering aid for a portable television camera as claimed in claim 1 or 2, wherein a rear end portion of said shoulder pad member is substantially T-shaped.

13. A shouldering air for a portable television camera having a mechanically operable start switch and a detachable hand grip, comprising:
(a) a base member arranged to be attachable to the body of said portable television camera, said base member having a front end portion and a rear end portion, said front end portion having means for attaching said hand grip having a manipulation knob, a recess being made in the upper surface of said base member;
(b) a linking mechanism arranged to slide with respect to said base member for interlocking said manipulation knob of said hand grip and said start switch of said television camera;
(c) a shoulder pad member attached, at a front end portion thereof, to said rear end portion of said base member;
(d) means for fastening said shoulder pad member to said base member;
(e) an electronic view finder mounting assembly having an upper L-shaped arm and a lower L-shaped arm securely connectable to each other, said lower L-shaped arm having a base portion received in said recess made in said upper surface of said base member, said upper L-shaped arm having a mount for carrying an electronic view finder electrically connected to said television camera.

14. A shouldering aid for a portable television camera having a mechanically operable start switch, comprising:
(a) a base member arranged to be attachable to the body of said portable television camera, said base member having a front end portion and a rear end portion, a recess being made in the upper surface of said base member;
(b) a hand grip attached to said front end of said base member;
(c) a manipulation knob incoporated in said hand grip;
(d) a linking mechanism arranged to slide with respect to said base member for interlocking said manipulation knob of said hand grip and said start switch of said television camera;
(e) a shoulder pad member attached, at a front portion thereof, to said rear end portion of said base member;
(f) means for fastening said shoulder pad member to said base member; and
(g) an electronic view finder mounting assembly having an upper L-shaped arm and a lower L-shaped arm securely connectable to each other, said lower L-shaped arm having a base portion received in said recess made in said upper surface of said base member, said upper L-shaped arm having a mount for carrying an electronic view finder electrically connected to said television camera.

15. A shouldering aid for a portable television camera as claimed in one of claims 9, 13 or 14, further comprising a cushion member made of a resilient material, said cushion material being attached to the lower surface of said mount.

16. A shouldering aid for a portable television camera as claimed in claim 15, further comprising an electronic view finder mounted on said mount of said upper L-shaped arm, said electronic view finder having an eyepiece located at one side of said electronic view finder.

17. A shouldering aid for a portable television camera as claimed in claim 1 or 2, further comprising tripod support means for supporting the camera formed of a portion of said shoulder pad member having a width greater than that of remaining portions, the wide rear end portion cooperating with said hand grip to form said tripod support.

18. A shouldering aid for a portable television camera as claimed in claim 17, further comprising a hand strap attached to said hand grip, said shoulder pad member having means for engaging said hand strap to form a carrying handle for the camera, said means for engaging including a slot in the vicinity of said rear end portion of said shoulder pad member for receiving said hand strap.

19. A shouldering aid for a portable television camera as claimed in claim 1 or 2, further comprising tripod support means for supporting the camera formed of a rear end portion of said shoulder pad member having a width substantially equal to the width of said television camera body, the rear end portion cooperating with said hand grip to form said tripod support.

20. A shouldering aid for a portable television camera as claimed in claims 1 or 2, further comprising tripod support means for supporting the camera formed of a rear end portion of said shoulder pad member which is substantially T-shaped, the rear end portion cooperating with said hand grip to form said tripod support.

21. A shouldering air for a portable television camera as claimed in claim 1 or 2, further comprising an electronic view finder mounting assembly having a lower end portion arranged to be interposed between an upper surface of said base member and the bottom of said portable television camera, an upper end portion arranged to be placed on the top of said television camera, and a connecting member connected at its both ends to said lower and upper end portions respectively, said electronic view finder mounting assembly being secured such that said television camera is tightly sandwiched between said lower and upper end portions.

22. A shouldering aid for a portable television camera as claimed in claim 1 or 2, further comprising means for adjusting the length of said shouldering aid by displacing said shoulder pad member with respect to said base member, comprising two projections at the front end portion of said shoulder pad, each having an elongate slot.

23. A shouldering aid for a portable television camera as claimed in claim 22 wherein the fastening means comprises at least one screw inserted through said elongate slots made in said projections of said shoulder pad member and engaged with a threaded hole made at said rear end portion of said base member so that the inclination angle of said shoulder pad member can be adjusted and fixed with respect to said base member.

* * * * *

UNITED STATES PATENT OFFICE
CERTIFICATE OF CORRECTION

Patent No. 4,407,437            Dated October 4, 1983

Inventor(s)     Takayuki Takubo

It is certified that error appears in the above-identified patent and that said Letters Patent are hereby corrected as shown below:

Cover page, following Item [22], "Filed: Apr. 30, 1981", insert the following lines:

--[30] Foreign Application Priority Data

Apr. 30, 1980 [JP]    Japan............... 55-59513[U]
    Apr. 30, 1980 [JP]    Japan............... 55-59514[U]
    Apr. 30, 1980 [JP]    Japan............... 55-59515[U]--

*Signed and Sealed this*

*Twenty-seventh* Day of *December 1983*

[SEAL]

*Attest:*

GERALD J. MOSSINGHOFF

*Attesting Officer*     *Commissioner of Patents and Trademarks*